US009156153B2

(12) United States Patent
Dvorak et al.

(10) Patent No.: US 9,156,153 B2
(45) Date of Patent: Oct. 13, 2015

(54) COLLET FAN FOR A ROTARY TOOL

(75) Inventors: Christopher Ryan Dvorak, Chicago, IL (US); Balazs Nagy, Arlington Heights, IL (US); Wayne F. Adolf, Mount Prospect, IL (US); Edward G. Ennis, Belle Vista, AR (US); Jie Liu, Lisle, IL (US)

(73) Assignee: Robert Bosch GmbH, Stuttgart (DE)

( * ) Notice: Subject to any disclaimer, the term of this patent is extended or adjusted under 35 U.S.C. 154(b) by 637 days.

(21) Appl. No.: 13/552,889

(22) Filed: Jul. 19, 2012

(65) Prior Publication Data
US 2014/0020919 A1   Jan. 23, 2014

(51) Int. Cl.
B25F 5/00 (2006.01)
B23Q 11/00 (2006.01)
B25F 3/00 (2006.01)

(52) U.S. Cl.
CPC ............... *B25F 5/00* (2013.01); *B23Q 11/005* (2013.01); *B23Q 11/0046* (2013.01); *B23Q 11/0046* (2013.01); *B25F 3/00* (2013.01); *Y10T 279/17504* (2015.01); *Y10T 279/3493* (2015.01); *Y10T 408/44* (2015.01); *Y10T 409/303976* (2015.01)

(58) Field of Classification Search
CPC ...... B23B 31/02; B23B 31/201; B23B 31/30; B23Q 11/0046; B23Q 11/12; B23Q 11/127; B23Q 11/005; H02K 7/02; H02K 9/06; Y10T 409/303976; Y10T 279/17504; Y10S 29/083
USPC .................. 173/197, 198, 217, 29, 132, 171; 409/67, 131, 132, 134, 135, 137; 144/134.1, 136.95; 279/48, 142; 408/56, 67
See application file for complete search history.

(56) References Cited

U.S. PATENT DOCUMENTS

| 1,635,769 | A | * | 7/1927 | Royle ........................... 416/237 |
| 2,006,108 | A | * | 6/1935 | Montuori ..................... 451/453 |
| 2,377,271 | A | * | 5/1945 | Schumann ..................... 464/17 |
| 2,760,781 | A |   | 8/1956 | Mann |
| 4,516,357 | A | * | 5/1985 | Gach ............................ 451/231 |
| 5,375,637 | A | * | 12/1994 | Matsumoto et al. ..... 144/136.95 |

(Continued)

FOREIGN PATENT DOCUMENTS

GB   2401576 A   11/2004
JP   2007-083345 A   4/2007

OTHER PUBLICATIONS

International Search Report and Written Opinion corresponding to PCT Application No. PCT/US2013/050252, mailed Oct. 18, 2013 (9 pages).

*Primary Examiner* — Scott A. Smith
(74) *Attorney, Agent, or Firm* — Maginot Moore & Beck LLP

(57) ABSTRACT

A rotary tool includes a motor having an output shaft, the output shaft defining an axis of rotation. The motor is configured to rotate the output shaft in a first direction about the axis of rotation. An accessory tool retention mechanism is attached to a distal end portion of the output shaft and configured to releasably retain an accessory tool in alignment with the axis of rotation. A fan mechanism includes a plurality of fan blades attached to the accessory tool retention mechanism and extending radially outwardly therefrom. The plurality of fan blades are configured to move air forwardly in a direction that is generally parallel to the axis of rotation as the accessory tool retention mechanism is rotated in the first direction by the output shaft.

5 Claims, 7 Drawing Sheets

(56) References Cited

U.S. PATENT DOCUMENTS

| | | | |
|---|---|---|---|
| 5,632,578 A * | 5/1997 | McCurry et al. | 409/136 |
| 5,772,367 A * | 6/1998 | Daniel | 408/67 |
| 6,146,066 A * | 11/2000 | Yelton | 409/134 |
| 6,411,000 B1 * | 6/2002 | Rew | 310/62 |
| 6,814,157 B2 * | 11/2004 | Maras | 173/171 |
| 7,171,997 B2 * | 2/2007 | Nishikawa et al. | 144/136.95 |
| 8,696,271 B2 * | 4/2014 | Dickey | 409/132 |
| 2012/0121354 A1 | 5/2012 | Dickey | |

\* cited by examiner

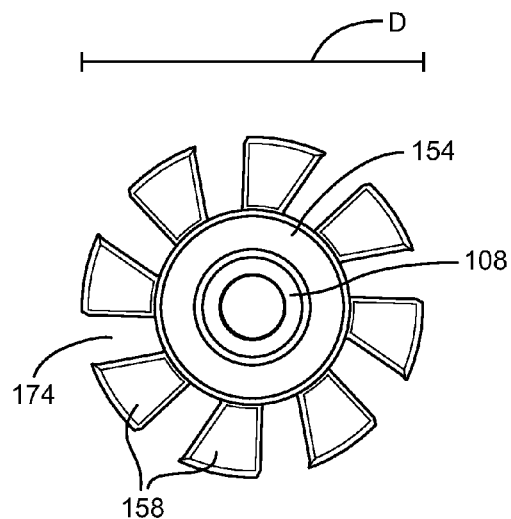
FIG. 9
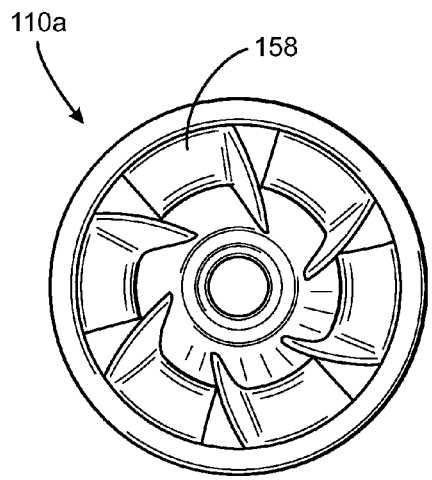 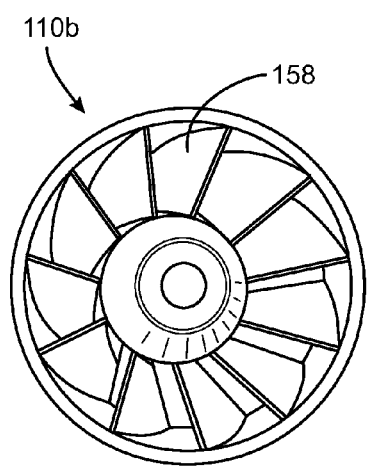
FIG. 10        FIG. 11

COLLET FAN FOR A ROTARY TOOL

TECHNICAL FIELD

The present disclosure relates generally to power tools, and more particularly to attachments and accessories for use with handheld rotary power tools.

BACKGROUND

In general, rotary power tools are light-weight, handheld power tools capable of being equipped with a variety of accessory tools and attachments, such as cutting blades, sanding discs, grinding tools, and many others. These types of tools typically include a generally cylindrically-shaped main body that serves as an enclosure for an electric motor as well as a hand grip for the tool. The electric motor drives an output shaft to rotate at high speeds. The output shaft is equipped with an accessory attachment system that enables various accessory tools to be releasably secured to the power tool. As the output shaft is rotated, an accessory tool attached to the tool holder is driven to perform a particular function, such as sanding, grinding, or cutting, depending on the configuration of the accessory tool.

While using rotary tools, it is common for dust and debris to gather at the contact point between the accessory tool and the work surface. This gathering of dust can adversely impact the visibility of the work area and make it difficult to perform certain tasks, such as following an outline on the work surface, that require accuracy and/or precise positioning of the tool in relation to the work surface. In many cases, the user has to stop using the rotary tool to remove dust from the area with a vacuum or bare hand in order to maintain adequate visibility of the work surface. Dust can also gather on the hands of the user of the rotary tool during use and be transferred to other areas and surfaces, thus increasing the area and amount of cleanup required.

What is needed is a device incorporated into the rotary tool that can eliminate dust from the area surrounding the contact point between the tool accessory and the work piece while not impeding tool performance, visibility of working area, usage of tool, and post job cleanliness of working area and that does not significantly increase the cost and complexity of the rotary tool.

BRIEF DESCRIPTION OF THE DRAWINGS

FIG. 9 depicts an alternative embodiment of a fan mechanism for the accessory attachment system of FIGS. 1-5 omitting an outer ring.

FIGS. 10 and 11 depict alternative embodiments of fan mechanisms for the accessory attachment system showing different numbers of fan blades.

DETAILED DESCRIPTION

Figure 1:
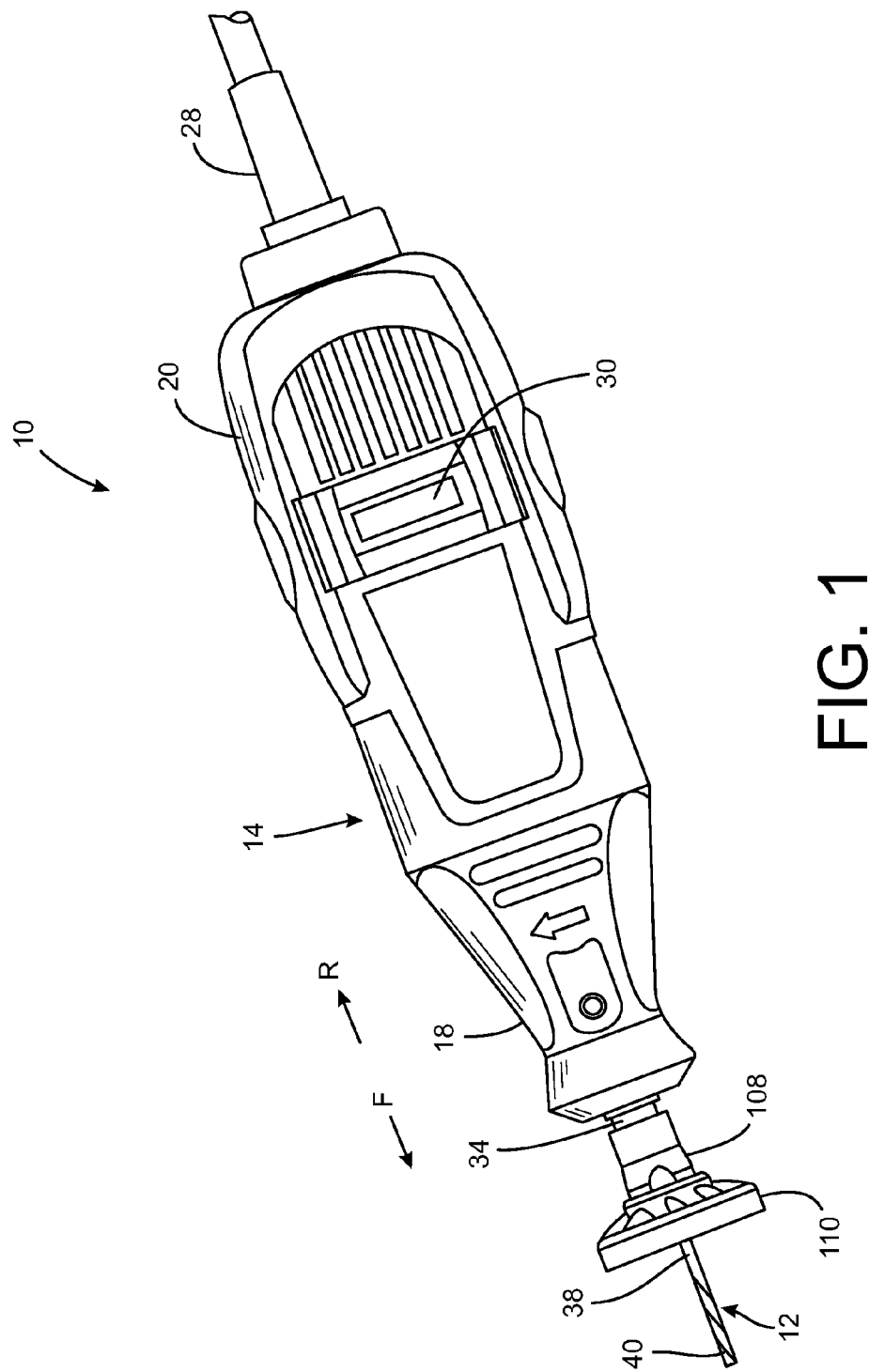
FIG. 1 is a perspective view of an embodiment of a power tool that includes an accessory attachment system equipped with a fan mechanism according to the present disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present disclosure includes any alterations and modifications to the illustrated embodiments and includes further applications of the principles of the invention as would normally occur to one of ordinary skill in the art to which this invention pertains.

In accordance with one embodiment of the present disclosure, a rotary tool comprises a motor having an output shaft, the output shaft defining an axis of rotation, the motor being configured to rotate the output shaft in a first direction about the axis of rotation. The rotary tool includes an accessory tool retention mechanism attached to a distal end portion of the output shaft that is configured to releasably retain an accessory tool in alignment with the axis of rotation. The rotary tool is provided with a fan mechanism that includes a plurality of fan blades attached to the accessory tool retention mechanism extending radially outwardly therefrom, the plurality of fan blades being configured to move air forwardly in a direction that is generally parallel to the axis of rotation as the accessory tool retention mechanism is rotated in the first direction by the output shaft.

In accordance with another embodiment, a fan mechanism for a rotary tool comprises an accessory tool retention mechanism configured for removable attachment to a distal end portion of an output shaft of a rotary tool in alignment with an axis of rotation of the output shaft. The accessory tool retention mechanism is configured to releasably retain an accessory tool in alignment with the axis of rotation. The fan mechanism includes a plurality of fan blades that are attached to the accessory tool retention mechanism extending radially outwardly therefrom. The plurality of fan blades is configured to move air forwardly in a direction that is generally parallel to the axis of rotation as the accessory tool retention mechanism is rotated by the output shaft.

Turning to the figures, FIG. 1 illustrates a rotary tool 10 of the present disclosure. The rotary tool 10 includes an accessory tool attachment system 100 that enables accessory tools, such as accessory tool 12, to be quickly installed and removed from the rotary tool 10. As discussed below, the accessory tool attachment system 100 includes a fan mechanism 110 configured to blow dust and debris from the immediate work surface as the tool is being used while not impeding tool performance, visibility of working area, usage of tool, and post job cleanliness of working area.

The rotary tool 10 includes a generally cylindrically shaped housing 14 constructed of a rigid material such as plastic, metal, or composite materials such as a fiber reinforced polymer. The housing 14 includes a nose portion 18 and a main body portion 20. The main body portion 20 serves as the handle for the tool 10 and encloses a motor (not shown). In one embodiment, the motor comprises an electric motor configured to receive power from an AC outlet (not shown) via a power cord 28. Alternatively, electric power for the motor may be received from a rechargeable battery (not shown) connected at the base of the main body portion 20. As an alternative to electric power, the rotary tool 10 may be pneumatically or hydraulically powered. Power to the motor is controlled by a power switch 30 provided on the handle portion 20 of the housing 14.

Figure 2:
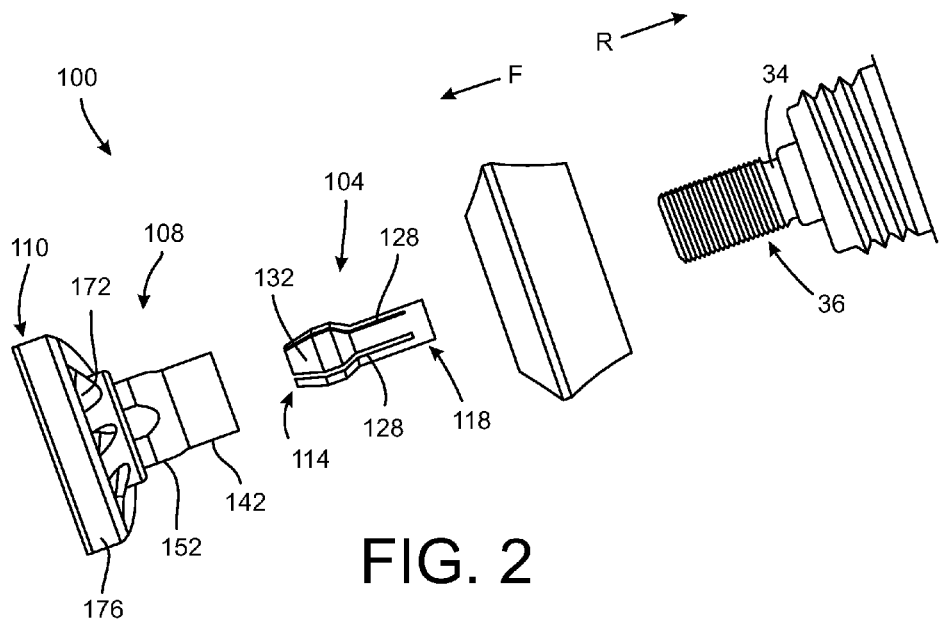
FIG. 2 is an exploded view of the accessory attachment system of the power tool of FIG. 1.
Figure 3:
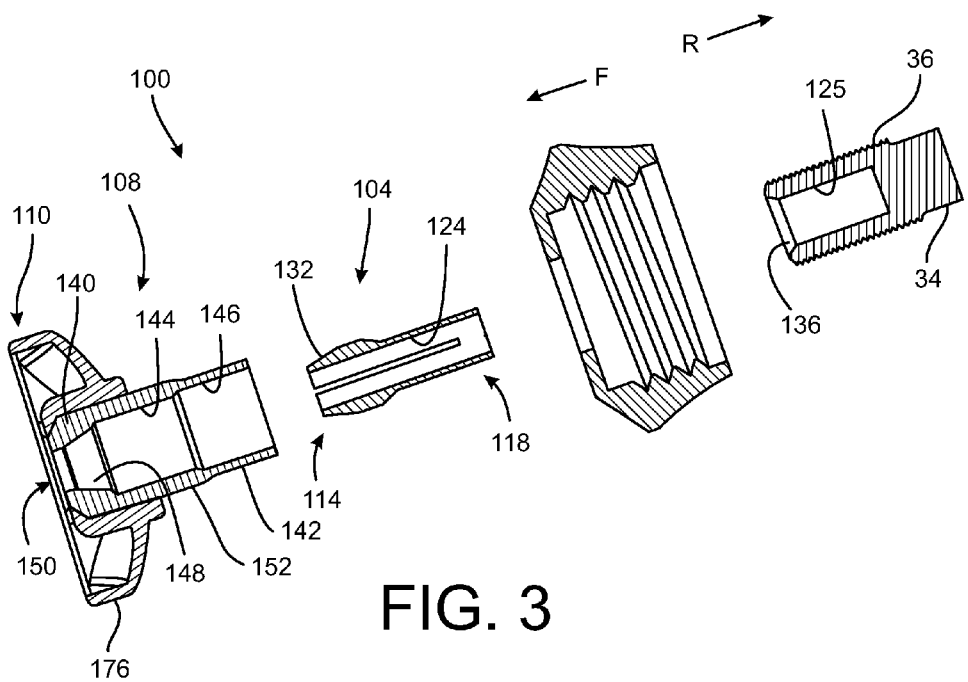
FIG. 3 is a cross-sectional view of the accessory attachment system of FIG. 2.
Figure 4:
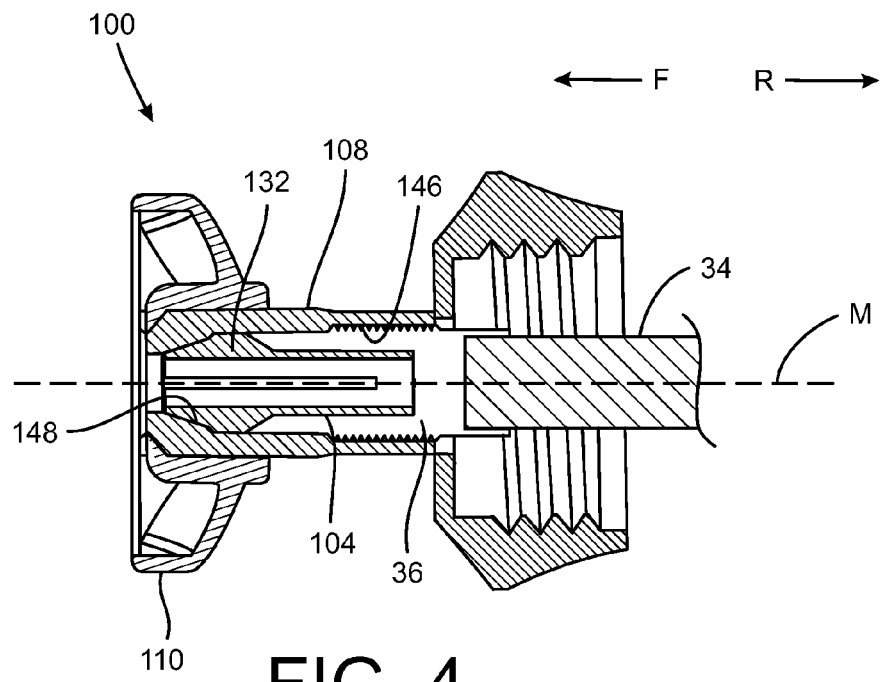
FIG. 4 is a cross-sectional view of the accessory attachment system of FIG. 2 showing the collet nut and collet of the accessory attachment system secured to the output shaft of the motor of the power tool.

The motor has an output shaft 34 (FIG. 4) that is configured to be rotated by the motor about a motor axis M. Referring to FIGS. 2-4, the accessory attachment system 100 is attached to a distal end portion 36 of the output shaft 34. The accessory attachment system 100 is configured to removably retain any one of a plurality of different accessory tools, or tool bits, to the output shaft of the rotary tool 10. Accessory tools, including an accessory tool 12, have a shank 38 and a working portion 40 (FIG. 1). The shank 38 is generally cylindrical and has a predetermined diameter, such as, for example, one quarter (¼) of an inch, three sixteenths (³⁄₁₆) of an inch, one eighth (⅛) of an inch, four to six (4-6) millimeters and/or the like. The working portion 40 has a configuration adapted to perform a specific type of task or tasks, such as, for example, milling, drilling, cutting, grinding, and the like.

The accessory attachment system 100 includes a collet 104, a collet nut 108, and a fan mechanism 110. As depicted in FIGS. 2-4, the collet 104 comprises a generally cylindrical body having a leading end portion 114 and a trailing end portion 118 that define a longitudinal bore or passage 124. The collet body is configured to be slidably inserted into a bore 125 defined in the distal end portion 36 of the output shaft 34. The passage 124 has a diameter sized to slidably receive the shank 38 of the accessory tool. The leading end portion 114 of the collet 104 defines a shank insertion opening 126 that leads into the passage 124. The shank 38 of an accessory tool is inserted through a shank insertion opening 126 and into the passage 124 when mounting the accessory tool 12 onto the rotary tool 10.

A plurality of slots 128 are defined along a portion of the length of the collet 104. The slots 128 divide the collet body into segments 130 that can be deflected radially inwardly to provide a clamping force on the shank 38 of an accessory tool received in the passage 124. In the embodiment of FIGS. 2-4, the collet 104 includes three slots 128 that divide the collet into four segments 130 although more or fewer slots may be used. The leading end portion 114 of each segment 130 of the collet 104 is enlarged to form jaw portions 132 having conical or tapered outer surfaces. The tapered outer surfaces of the jaw portions 132 form cam surfaces that are engaged by interior surfaces 136 of the distal end portion 36 of the output shaft 34 and interior surfaces 148 of the collet nut 108 to cause the jaw portions 132 of the collet 104 to clamp onto the shank 38 of the accessory tool 12.

The collet nut 108 has a generally cylindrically-shaped body including a leading portion 140 and a trailing portion 142 defining a longitudinal bore 144 extending therebetween. The trailing portion 142 of the collet nut 108 includes a threaded inner surface 146 that defines a rearward portion of the longitudinal bore 144. The threaded inner surface 146 is configured for meshing engagement with the threaded outer surface of the distal end portion 36 of the output shaft 34. The leading portion 140 of the collet nut 108 includes a tapered inner surface 148 that defines a forward portion of the longitudinal bore 144. The tapered surface 148 forms a generally frusto-conical camming surface for engaging the outer surface of the jaw portions 132 of the collet 104. The leading portion 140 of the collet nut 108 also defines an insertion opening 150 that leads into the bore 144. The insertion opening 150 is sized to permit passage of the shank 38 of the accessory tool into the passage 124 of the collet 104 when the collet 104 and collet nut 108 are positioned on the distal end portion 36 of the output shaft 34.

When the collet nut 108 is threaded onto the end portion 36 of the output shaft 34, the tapered inner surface 148 of the collet nut 108 and the inner surface 136 of the bore 125 in the output shaft 34 contact the jaw portions 132 of the collet 104. As the collet nut 108 is tightened onto the output shaft 34, the tapered inner surface 148 of the collet nut 108 and the inner surface 136 of the bore 125 exert a compression force against the jaw portions 132 of the collet 104. This force compresses the jaw portions 132 of the collet 104 radially inward to grip the shank 38 of the accessory tool 12. When the collet nut 108 is threaded off of the end portion of the output shaft 34, the forces exerted by the tapered surfaces 148 on the jaw portions 132 of the collet 104 are reduced and the jaws 132 are allowed to expand and release the shank 38 of the accessory tool 12.

In accordance with one embodiment of the present disclosure, the fan mechanism 110 of the accessory attachment system 100 is attached to an outer surface 152 of the collet nut 108. The function of the fan mechanism 110 is to propel, displace, or move air generally forwardly in direction F, parallel to the axis M of the output shaft 34 as the collet nut 108 is driven to rotate by the output shaft 34 of the motor. The fan mechanism 110 can blow dust and debris from the area in front of the rotary tool thus creating better visibility of the work area as the tool is being used. The fan mechanism 110 can also prevent the users hand from getting covered in dust. In addition, the configuration of the fan mechanism 110 has minimal impact on visibility of the work area and usage of the tool.

Figure 5:
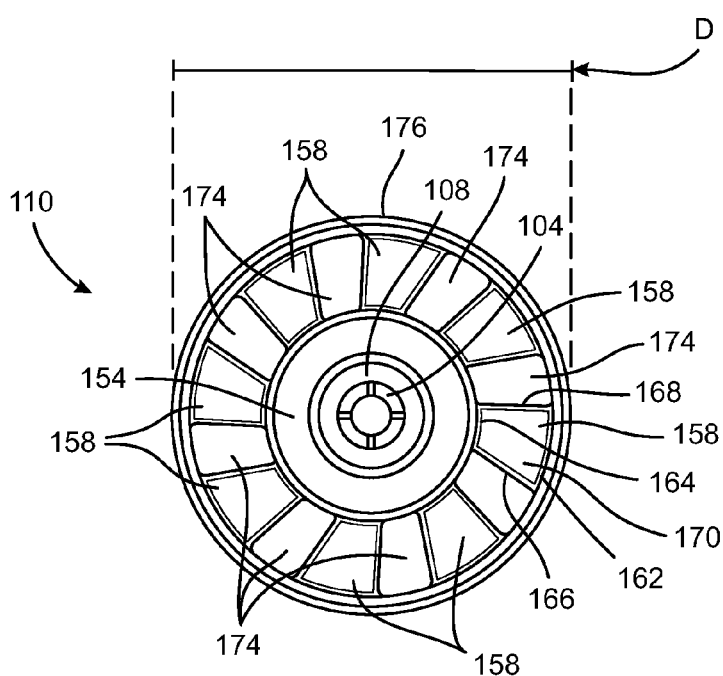
FIG. 5 is a front elevational view of the accessory attachment system showing the blades of the fan mechanism.

Referring to FIG. 5, the fan mechanism 110 includes a central hub 154 attached concentrically to the collet nut 108 and a plurality of fan blades 158 that extend radially outwardly from the hub 154. The hub 154 of the fan mechanism 110 includes an inner surface 160 (see FIG. 4) that is attached to the outer surface 152 of the collet nut 108 and defines a passage through which the collet nut 108 extends. The fan blades 158 are oriented to direct air generally forwardly in a direction F that is generally parallel to the axis M of the output shaft 34 as the fan mechanism 110 is rotated by the output shaft 34 along with the collet nut 108.

Figure 6:
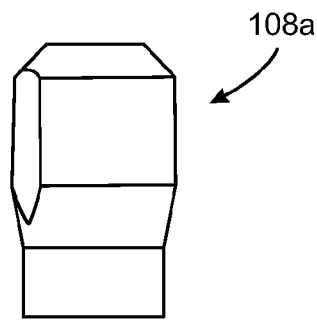
FIGS. 6-8 depict various embodiments of collet nuts for the accessory attachment system with the fan mechanism removed therefrom.
Figure 7:
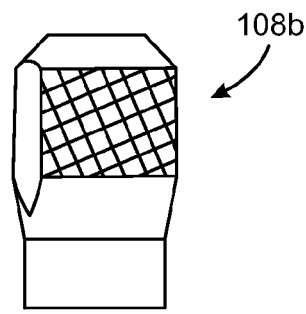
Figure 8:
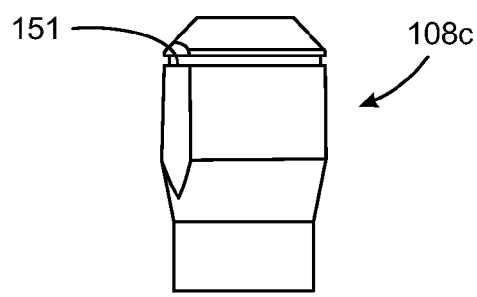

In the embodiment of FIGS. 1-5, the fan mechanism 110 is formed of a plastic material although any suitable material may be used including metal depending on how the fan mechanism 110 is attached to the collet nut. In one embodiment, the fan mechanism 110 is attached to the collet nut 108 by insert molding the fan mechanism 110 onto the collet nut 108 thereby forming the fan mechanism 110 as a substantially permanent fixture of the collet nut 108. In this embodiment, the outer surface 152 of the collet nut 108 may be provided with features to facilitate retention and fixation of the fan mechanism 110 to the collet nut. FIGS. 6-8 depict various embodiments of collet nuts 108 onto which a fan mechanism 110 can be molded. The collet nut 108a of FIG. 6 has a faceted shape with a smooth outer surface. The outer surface of the collet nut 108b of FIG. 7 has a knurled texture to facilitate bonding between the fan mechanism 110 and the collet nut 108 when the fan mechanism 110 is molded onto the collet nut. The collet nut 108c of FIG. 8 includes a slot 151 into which molten plastic material of the fan mechanism 110 can flow and solidify to facilitate retention of the fan mechanism 110 to the collet nut. The collet nut 108 can be provided with a variety of other configurations, including various surface textures, recesses, grooves, slots, and the like, to facilitate retention of the fan mechanism 110 to the collet nut 108.

Figure 17:
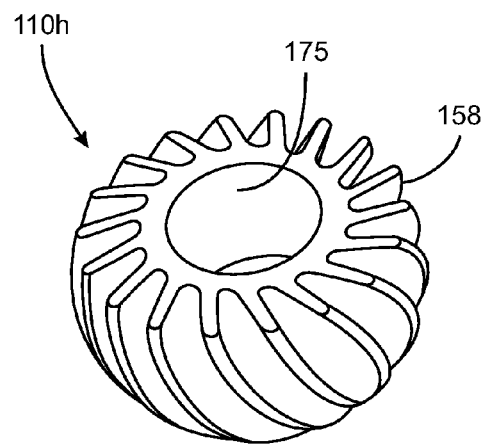

In alternative embodiments, the fan mechanism 110 may be manufactured separately and fixedly secured to the collet nut 108. For example, in some embodiments, the fan mechanism 110 may be molded as a separate component and secured to the collet nut 108 by press welding or ultrasonic welding. In other embodiments, the fan mechanism 110 may be adhered to the outer surface 152 of the collet nut. The fan mechanism 110 may also be provided as a metal part that is fitted onto the collet nut 108 or machined out of the same material used to form collet nut. The fan mechanism 110 of FIGS. 1-5 serves as a structure for the user to grasp and turn when threading the collet nut 108 onto and off of the end portion of the output shaft 34 of the motor. As an alternative, some embodiments of fan mechanisms may be configured for removable attachment to the collet nut 108 so that the fan mechanism can be installed and removed from the collet nut 108 as needed as depicted in FIGS. 17 and 18.

The plurality of fan blades 158 extends radially outwardly from the hub 154 in directions that are transverse to the axis M of the rotary tool 10. The fan blades 158 are the principal working surfaces of the fan mechanism 110 and are configured to move air generally axially in the forward direction F as the collet nut 108 is driven to rotate. In one embodiment, the fan blades 158 are formed integrally, e.g., molded, with the hub 154 of the fan mechanism 110 although, as an alternative, the fan blades 158 may be manufactured separately from the hub 154 and subsequently fastened or adhered to the hub 154.

Each fan blade 158 of the fan mechanism 110 includes a tip portion 162, a base portion 164, a leading edge portion 166, a trailing edge portion 168, a leading surface 170, and a trailing surface 172. The tip portion 162 is positioned distally with respect to the hub 154 while the base portion 164 is adjacent to the hub 154. The leading edge portion 166 of the blade 158 is oriented in the forward direction F and the trailing edge portion 168 of the blade 158 is oriented in the rearward direction R. The leading and trailing surfaces 170, 172 of the blade 158 extend between the tip portion 162 and base portion 164 from the leading edge portion 166 to the trailing edge portion 168 of the blade 158 with the leading surface 170 facing generally forwardly and the trailing surface 172 facing generally rearwardly in relation to the rotary tool 10.

The shape of the fan blade 158 defined by the leading and trailing edge portions can be almost anything from square to round to rectangular. The blades 158 can have a substantially uniform distance between the leading and trailing edge portions between the base portion 164 and the tip portion 162 or can be configured to be wider at one end of the blade 158 than the other, e.g., wider at the tip portion 162 than the blade 158 portion or vice versa. In addition, the tip portion 162 of the blade 158 can be rounded, squared, or have rounded corners.

The leading edge portion 166 and trailing edge portion 168 of the blade 158 are arranged with respect to each other to position at least a portion of the leading surface 170 at a transverse angle relative to the axis M of the rotary tool so that, as the fan mechanism 110 is rotated in a first direction, at least a portion of the leading surface 170 is facing in the first direction. The angle of the leading surface 170 relative to the axis M of the rotary tool 10 defines the blade pitch which is typically greater than 0 degrees (i.e., parallel to the axis M) and less than 90 degrees (i.e., perpendicular to the axis M). The blades 158 can be flat in which case the blade pitch is the substantially constant from the base portion 164 to the tip portion 162 of the blade. The blades 158 can also be curved or twisted in which case the blade pitch varies between the base portion 164 and the tip portion 162. The blades 158 have a thickness that corresponds to the distance between the leading and trailing surfaces. The blades 158 can have a substantially constant thickness from the base portion 164 to the tip portion 162 between the leading edge portion 166 and trailing edge portion 168. Alternatively, the blades 158 can be provided with a variable thickness, e.g. a foil shape, between the base portion 164 and tip portion 162 and between the leading and trailing edge portions of the blades 158.

The blades 158 are substantially evenly spaced apart from each other about the periphery of the hub 154 to form air flow paths 174 between each blade as depicted in FIG. 5. As the fan mechanism 110 is rotated in a first direction, the leading surfaces 170 of the fan blades 158 deflect air axially along the air flow paths 174 from the trailing edge portions 172 of the blades 158 toward the leading edge portions 168 of the blade, and, as a result, air is moved generally forwardly in front of the fan mechanism 110. The amount and velocity of the air that is moved is a function of the speed of rotation of the fan mechanism and collet nut as well as the configuration of the blades 158. The number of blades, shape of blades, orientation and pitch of blades, spacing between blades, and diameter of the fan mechanism can be modified to change the velocity and amount of air moved by the fan and to accommodate different configurations of rotary tools.

In the embodiment of FIGS. 1-5, the fan mechanism 110 includes an outer ring 176 or band that extends around the fan mechanism to which the tip portions 162 of the blades are attached. The outer ring 176 shields and protects the tip portions of the blades from contact and possible damage. In alternative embodiments, the outer ring 176 of the fan mechanism can be omitted as depicted in FIG. 9. The diameter D of the fan mechanism 110 is defined by the diameter of the outer ring 176 in the embodiment of FIGS. 1-5. In embodiments in which the outer ring is omitted as depicted in FIG. 9, the diameter of the fan mechanism corresponds to the widest distance between the tip portions of the blades on one side of the hub 154 and the tip portions of the blades on the opposite side of the hub 154 along a line that passes through the central axis of the hub 154. In either case, the diameter of the fan mechanism is selected to minimize the impact on visibility at the front of the rotary tool while still providing adequate air moving capability for the rotary tool.

Figure 12:
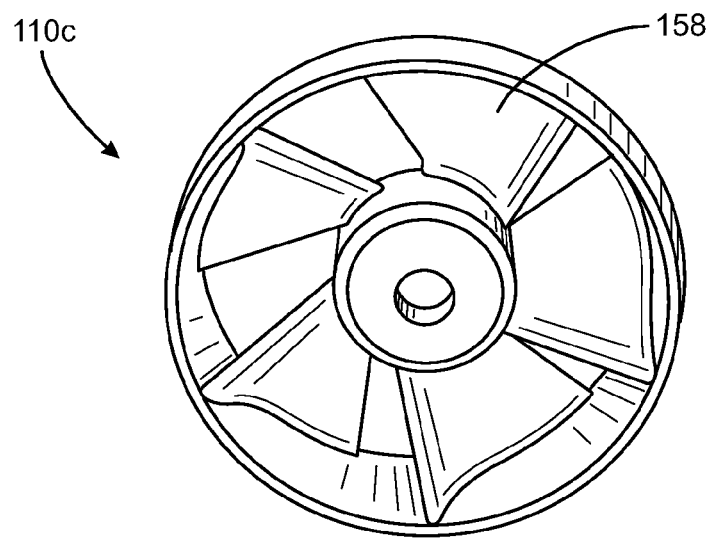
FIGS. 12 and 13 depict alternative embodiments of fan mechanisms for the accessory attachment system showing variations in blade profile.
Figure 13:
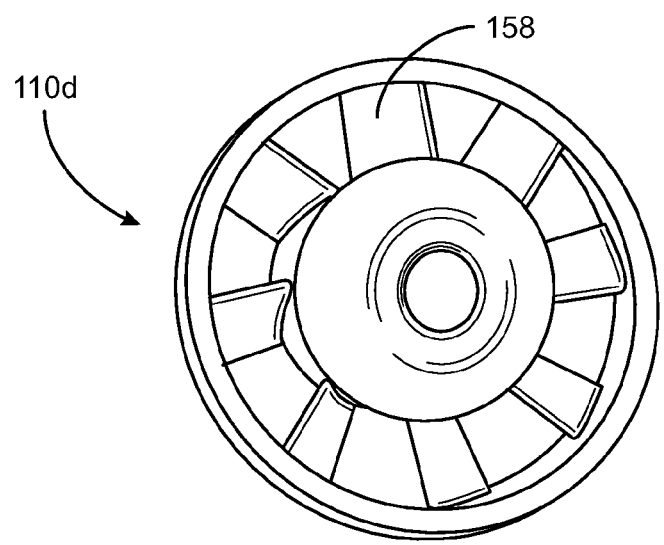

In the embodiment of FIGS. 1-5, the fan mechanism 110 is shown as having eight blades 158. FIGS. 10 and 11 show embodiments of fan mechanisms 110a, 110b having different numbers of fan blades. In particular, the fan mechanism 110a of FIG. 10 includes six blades 158 and the fan mechanism 110b of FIG. 11 includes eleven blades 158. In other embodiments, any suitable number of blades may be used depending on blade size, desired blade spacing, and size of the hub. FIGS. 12 and 13 show alternative embodiments of fan mechanisms that show examples of variations in blade profile. In the embodiment of FIG. 12, the fan mechanism 110c includes five blades that are wider at the tip portions and are curved. In the embodiment of FIG. 13, the fan mechanism 110c includes eight blades 158 that are substantially flat and uniform in width.

Figure 14:
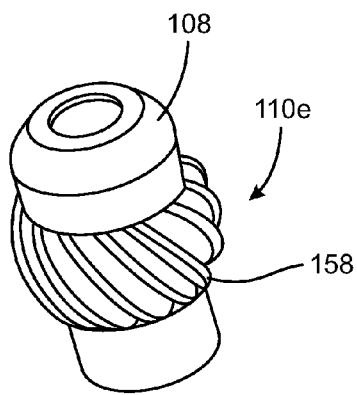
FIGS. 14 and 15 depict alternative embodiments of fan mechanisms for the accessory attachment system in which the fan mechanism is integral with the collet nut.
Figure 15:
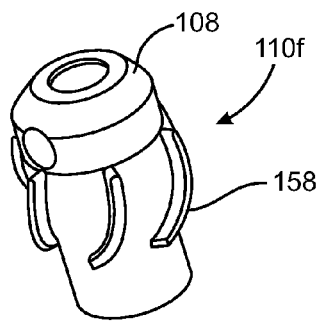

The fan mechanisms of FIGS. 1-5 and 9-13 are formed of a plastic material that is molded onto or otherwise attached to a metal collet nut of the rotary tool 10. FIGS. 14 and 15 depict alternative embodiments of fan mechanisms 110e, 110f in which the collet nut 108 itself forms the hub of the fan mechanism and the fan blades 158 are metal structures that are integrally formed with the collet nut, e.g., by machining a collet nut to form the blades, or formed separately from the collet nut and affixed to the collet nut, e.g., by welding or bonding. FIGS. 14 and 15 show examples of different blade configurations, in the form of spiral web, that may be provided in metal fan blades provided on a collet nut 108.

Figure 16:
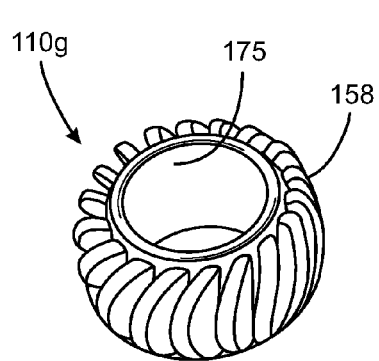
FIGS. 16 and 17 depict alternative embodiments of fan mechanisms for the accessory attachment system that are removable from the collet nut.

FIGS. 16 and 17 depict embodiments of fan mechanisms that are configured for removable attachment to a collet nut, such as the collet nuts of FIGS. 6-8. The fan mechanisms 110g, 110h of FIGS. 16 and 17 may be formed of a hard plastic material or metal material that is configured to be installed and removed from a collet nut as needed. The fan mechanisms 110g, 110h each include a central passage 175 in which the collet nut (not shown in FIGS. 16 and 17) is removably received and a plurality of teeth-like fans 158 for moving the air. The fan mechanisms 110g, 110h and/or the collet nut to which they are attached may be provided with features that facilitate a press-fit or snap-fit engagement with the collet nut. In other embodiments, the fan mechanisms 110g, 110h and associated collet nuts may be configured to have a threaded engagement or may be attached using some type of attachment or fastening mechanism.

The fan mechanisms in accordance with the present disclosure are described for use in conjunction with collet nuts of a rotary tool. In alternative embodiments, fan mechanisms may be incorporated into other portions of accessory attachment systems of rotary tools or other types of accessory attachment systems. For example, fan mechanisms may be incorporated into the nose cap or nose cover (not shown) that are installed over the collet nut or collet retaining mechanism of some rotary tools. Fan mechanisms may also be incorporated into the collet clamp or collet chuck (not shown) of quick change accessory attachment systems incorporated into some rotary tools.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A handheld rotary tool comprising:
   a generally cylindrically-shaped housing configured to serve as a handle for the tool;
   a motor enclosed in the housing and having an output shaft that extends from a nose portion of the housing, the output shaft defining an axis of rotation, the motor being configured to rotate the output shaft in a first direction about the axis of rotation;
   a collet nut attached to a distal end portion of the output shaft and located outside of the housing, the collet nut being configured to releasably retain an accessory tool in alignment with the axis of rotation; and
   a fan mechanism including a hub and a plurality of fan blades, the hub defining a central passage in which the collet nut is received, the plurality of fan blades being attached to the hub and extending radially outwardly therefrom, the plurality of fan blades being oriented to move air forwardly in a direction that is generally parallel to the axis of rotation as the collet nut is rotated in the first direction by the output shaft.

2. The rotary tool of claim 1, wherein the collet nut is removably attached to the distal end portion of the output shaft, and
   wherein the fan mechanism is removably attached to the collet nut.

3. The rotary tool of claim 1, wherein the fan mechanism is formed of a plastic material.

4. The rotary tool of claim 3, wherein the fan mechanism is fixed to the outer surface of the collet nut by insert molding the fan mechanism onto the collet nut.

5. The rotary tool of claim 1, wherein each fan blade in the plurality of fan blades includes a tip portion, and
   wherein the fan mechanism includes an outer ring that surrounds the plurality of fan blades to which the tip portions of the fan blades are attached.

* * * * *